United States Patent [19]

Aarre et al.

[11] Patent Number: 5,538,356
[45] Date of Patent: Jul. 23, 1996

[54] SWIVEL LINK

[76] Inventors: Arne Aarre, Askepottveien 37; Knut S. Oaland, Røyskattveien 27, both of 4300 Sandnes, Norway

[21] Appl. No.: 313,081
[22] PCT Filed: Mar. 29, 1993
[86] PCT No.: PCT/NO93/00049
  § 371 Date: Sep. 29, 1994
  § 102(e) Date: Sep. 29, 1994
[87] PCT Pub. No.: WO93/20359
  PCT Pub. Date: Oct. 14, 1993

[30] Foreign Application Priority Data

Apr. 3, 1992 [NO] Norway ............................ 921294

[51] Int. Cl.⁶ ........................ F16C 11/04; F16B 3/06
[52] U.S. Cl. .................. 403/371; 403/370; 403/383; 403/52
[58] Field of Search ............................ 403/78, 66, 52, 403/374, 370, 371, 367, 383, 22

[56] References Cited

U.S. PATENT DOCUMENTS

| | | | |
|---|---|---|---|
| 1,585,532 | 5/1926 | Cole et al. | 403/371 X |
| 3,501,183 | 3/1970 | Stratienko | 403/371 X |
| 4,006,993 | 2/1977 | Woerlee | 403/359 |
| 4,367,053 | 1/1983 | Stratienko et al. | 403/371 |
| 5,009,539 | 4/1991 | Muellenberg | 403/371 X |
| 5,176,464 | 1/1993 | Tanner | 403/370 |
| 5,190,393 | 3/1993 | Svensson | 403/370 |

FOREIGN PATENT DOCUMENTS

| | | | |
|---|---|---|---|
| 7217 | 1/1980 | European Pat. Off. | |
| 55652 | 9/1952 | France | |
| 1365822 | 5/1964 | France | |
| 1534193 | 7/1968 | France | |
| 2191654 | 2/1974 | France | |
| 2819069 | 10/1979 | Germany | 403/370 |
| 113386 | 5/1968 | Norway | |
| 463225 | 10/1990 | Sweden | |
| 254047 | 12/1948 | Switzerland | 403/370 |
| 90/15262 | 12/1990 | WIPO | |

*Primary Examiner*—Anthony Knight
*Attorney, Agent, or Firm*—Andrus, Sceales, Starke & Sawall

[57] ABSTRACT

A swivel link, especially for use in rotatable interconnection of two relatively pivotable machine members (1) at the adjacent end portions. One (1) of the two members may be bifurcated to embrace the other member and formed with two aligned swivel link attachment holes (2). The swivel link comprises a bolt (3) and two expandable, internally conical sleeves (5). In the area of each cone sleeve (5), the bolt (3) has a correspondingly conical portion (3"). A coaxial threaded end trunnion (3"') at each end of the bolt (3) mounts a tightening nut (4) adapted for axially directed displacement of the adjacent cone sleeve (5) into the space between the attachment hole wall (2) and the conical portion (3") of the bolt (3). To prevent the bolt (3) from skidding/rotating within the cone sleeve (5), causing wearing and/or loosening of the tightening nut (4) and the cone sleeve (5) on the bolt (3), the conical portion (3") of the bolt (3) exhibits at least one axially extending, plane surface portion (3a") which, in the circumferential direction, has a spherical conical bolt portion at either side. The cone sleeve (5) is internally provided with a corresponding, plane surface portion (5b", 5d", 5f") cooperating with the plane surface portion (3a") on the bolt (3).

6 Claims, 5 Drawing Sheets

SWIVEL LINK

The present invention relates to swivel links, especially for use with the rotatable interconnection of two relative to each other swingable members at the adjacent end portions thereof, wherein the end portion of one member may be bifurcated and formed with two aligned swivel link attachment holes which, in the rotatably interconnected condition of the two members, correspond with a through-going bore in the end portion of the other member, said other member through the bore thereof accommodating the central bolt portion of the swivel link and being rotatably supported on said bolt portion, possibly through bearings. The bolt of the swivel link, outside said central bolt portion, is formed with conically tapering end portions each surrounded by a corresponding, internally conical sleeve, a so called cone, each assigned a nut, each rotatable on a threaded coaxial end trunnion of the bolt, each of said end trunnions axially protruding outside the respective conical bolt portion.

Upon tightening of the nuts on the end trunnions of the bolt axially inwardly in the direction of the centre of the bolt from opposite sides, the nuts each causes the associated cone to move axially inwardly, the internally conical faces of the cones being urged against and resting on the adjacent conically tapering end portion of the bolt, while the annular wedge-shaped wall of the cone is pressed into the complementarily shaped wedge-shaped annulus defined between the internal wall face of the attachment hole and the opposing face of the conically tapering end portion (positioned axially inwardly of the adjacent end trunnion) of the bolt, whereby the cones by means of the nuts wedge the conically tapering end portions of the bolt firmly into the attachment holes of the bifurcated end portion of said member. The other member of the two said members which is to be pivotly arranged in relation to the member having the bifurcated end portion, may be formed with a smooth circle-cylindrical bore for rotatable suspension directly on the central correspondingly formed axial portion of the bolt. Between said central bolt portion and said other member, an intermediate bearing may possibly be provided.

Upon large shifting loads and undermeasured (subdimensioned) attachments, a phenomenon called "beating out" will occur in conventionally designed swivel links of this kind, but also with correctly dimensioned attachments, problems will arise when disassembling such swivel links.

All swivel links between movable members include boles to be lubricated, maintained and kept up regularly. A common problem, particularly in equipment on offshore installations, is that the bolts get stuck within the attachments, so that the bolts must be jacked out or burned away upon disassembling or replacing the swivel link. Moreover, in equipment subjected to large loads, such as e.g. contractor machines (excavators, loading and charging machines, etc.), "beating-out" occurs in the attachments for the bolts. Usually, when such "beating-out" occurs, insertion of new linings into the equipment is tried, but more often portions of the attachments have to be burned away, new portions being welded on. Finally, the holes of the attachments, the attachment holes, must be line drilled. Risk of damages to the equipment due to wearing or beating-out, necessitates regular and frequent inspections and overhaulings as well as replacements of the bolts. This work is both time-consuming and expensive. In case the equipment in question has to be disassembled or where the swivel links are located such that they are difficult to reach, scaffolding must be rigged up and safety measures introduced, resulting in increasing consumption of time and increased costs.

As mentioned, in such swivel links, it is previously known to form the bolt body with conically tapering end portions positioned axially inwardly of the threaded end trunnions of the bolt body. These conical bolt portions are brought into engagement with the attachment holes, whereafter the nuts are screwed axially inwardly on the end trunnions of the bolt body, whereby the nuts carry with them the internally conical sleeves, the cones, which lock the conical end portions of the bolt body within the attachments. The nuts can be retightened in order to try to let the cones take up slackness and oval cross section of the attachment holes through deformation due to shifting loads and impact stresses, e.g. from an excavating assembly.

Likewise, it is known to use nuts with a locking ring, in order to reduce the risks of unscrewing the nuts upon vibrations and shakings from the machinery. However, such known devices do not give a satisfactory security against unscrewing of the nuts, the result actually being that the bolt can fall out of the attachments.

Also, devices are known to dislodge the cone sleeves upon disassembling. However, these known devices are constructively complex and exhibit huge limitations of application. That is, they are not in a position to accommodate and resist the loads in question. Mainly, these known devices are used to pull out and press in a conical sleeve on a machine member, but lack of space does not allow a measurement corresponding to accommodation of the very large axially extending force components to be found in connection with the equipment concerned, and which partly arise from the load itself and partly from the tightening moment necessary to drive the cone sleeves inwards and outwards on the bolt.

Generally, it is known to secure nuts and screw devices by means of seger rings, castle nuts and cotter or split pins, such that the nuts can not unscrew themselves from a shaft.

It is known that expanding sleeves serving to fix the conical portions of the bolt within the attachment holes, thereby taking up slackness and oval cross section or beating-out within the attachments, are locked by means of nuts having a locking device or nuts having a counter nut. Nuts are retightened as the cone sleeves and the attachment holes become beaten out and adapted to the conical expansion sleeves such that, finally, the cone sleeves fill out the space between the internal face of the attachment hole wall and the conical portions of the bolt. The locking nuts secure the swivel link such that the tightening nuts do not unscrew themselves, loosening the cones during the operation of the machine.

Also, there are many known ways of locking a boss or a hub on a straight shaft. Such a locking may be effected by means of wedges, split pins, set screws, etc., or by means of conical sleeves urged towards each other from opposite sides and being wedged between the shaft and the boss or hub.

However, in these known locking methods, one does not use an internally conical sleeve in connection with a conical bolt portion, and the purpose thereof is not to accommodate slackness and ovality within an attachment hole.

A serious disadvantage in known conical expanding sleeves adapted to accommodate slackness within such attachments/attachment holes is that the conical expanding sleeves become plastically deformed depending on the ovality or the ovalities that the attachment hole exhibits. Thereby, the ovality of the attachment hole is not removed; on the contrary, the situation gives rise to the development of larger ovalities and unevennesses. Conventionally, one has chosen a softer material for the cone sleeves than for the attachments, and this gives rise to notch formation in the cone surfaces, and the notches may prevent the cone sleeves from being pushed further into the attachment holes upon retightening of the nuts. Thereby, the swivel link becomes incapable of accommodating accumulated slackness within the attachments.

In extremely large ovalities in the attachment holes, the bolt and, consequently, The entire swivel link assumes an oblique position, displaced in relation to the intentional axis thereof. This may create torsions and eccentric moments, giving rise to fatigue failure in the bolt and attachment ears.

Experiences with construction machines and articulated connections generally have shown that the radial pressure and tension forces acting simultaneously with the twisting of the bolt, creates rotational movements acting on the bolt/swivel link/shaft. Upon repeated movements to and fro, the nuts loosen even if they are equipped with a locking device.

Locking nuts are constructed with a view of preventing loosening due to vibrations. However, they are not in a position to resist the large torsional stresses arising during the operation of an excavator, a lifting crane or similar machinery. This causes impacts and beating within cone sleeve, bolt and bearings, as well as within the attachments in which the cone sleeves sit. This causes large loads on the threaded end trunnions of the bolt. A not unusual result is fracture and sliding-out of the bolt, resulting in swivel link failure. This is a phenomenon which is increased substantially with poor lubrication of the equipment, as the torsional forces then become larger on the bolt.

All known cone designs serving to accommodate slackness and ovality in attachment holes, have completely round conical surfaces (cone faces), internally within the sleeves and externally on the bolt. Thereby, it is very difficult to make the cooperating bolt/cone "settle" such that relatively rotating movements do not result. Grease from lubrication of the bolt will be forced out on the conical end portions thereof, thereby creating an easier sliding between bolt and cone sleeve.

It is a special object of the present invention to eliminate the last-mentioned problem.

But, likewise, it is a large problem that the cones become looser as beating-out of the ovality between the cone and attachment hole wall takes place. Thereby, slackness between the cone and bolt occurs, in case one does not retighten the nuts frequently in order to accommodate this slackness; otherwise, said relative rotation may easily arise. However, frequent retightening of the nuts will be necessary in order to avoid bolt rotation within the cone sleeves and, thereby, unscrewing of the nuts.

In some types of machines, spherical sliding bearings are used in the movable "eye" of the link, for accommodating eccentric, radial obliquities of the rotational movements of the articulated connection. In known conical bolt designs overdimensioned bolts are used, such that a press fit is established between bolt and bearing. The purpose is that the bolt shall not work itself axially outwards from the intentional central position, and also that the bolt shall not rotate within the cone sleeves.

However, large disadvantages arise when such bolts are to be mounted in an existing swivel link. Namely, the bolt has to be "frozen" in order to be brought through the swivel bearing (spherical slide bearing), due to the overmeasure of the fit.

Corresponding problems are met when disassembling bolt connections upon maintenance and replacement. However, such press fits can only be used in cases where special slide bearings or other types of bearings are used. On machines and industrial equipment, most of the articulated connections suffering from "beating-out", are produced without such special bearings.

This way of preventing the bolt from rotating within the cone sleeves functions very poorly in practice. The torsional stress acting on the bolt becomes as large as if the bolt were stuck within the slide bearing. The bolt is subjected to rotational movements between the conical end portions of the bolt and the cone sleeves, resulting in unscrewing of the nuts axially outwards, thereby loosening the cone sleeves from the bolt. In the course of such a loosening process, large grinding damages and wearing arise on the conical end portions of the bolt and internally within the cone sleeves. This requires replacement of the bolt as well as cone sleeves.

It is not possible to use wedges in order to lock the bolt/shaft in relation to the cone sleeves, as the cone sleeves expand upon retightening, such that a possible wedge thereby would have achieved a reduced engagement within the groove of the cone sleeve. Split pins and set screws are unable to resist the large torsional moments arising during mechanical operation.

An object of the present invention is to provide a swivel link of the kind defined introductorily, wherein at least the most substantial of the above-mentioned disadvantages, deficiencies and limitations of application associated with prior art technique, are eliminated or considerably reduced and, thus, provide a swivel link of the kind concerned wherein measures have been taken to prevent the bolt/shaft from skidding/rotating within the internally conical expansion sleeves, such that wearing is reduced considerably and simultaneously as tightening nuts are prevented from unscrewing. Thereby it is prevented that the cone sleeves loosen on the bolt, simultaneously retightening does not have to be effected so often as in conventional swivel links of similar type.

According to the invention, said objects are realized through a design of the swivel joint as set forth in the following claims.

A substantial feature of the invention consists in shaping an axial portion of the internally conical surface of each cone sleeve plane, the conical portion of the bolt being shaped with a corresponding plane axially extending surface portion cooperating with said plane surface portion of the cone sleeve. Thereby, the cone sleeve may, as known per se, consist of loose segments, and one or more of these segments may have a plane course and form a plane land surface for resting against the plane surface portion of the bolt cone.

Such a design having plane surface portions within a cone sleeve and on the conical end portion of the bolt; counteracts skidding/rotation of the bolt within the conical expansion sleeves.

Advantageously, according to the invention, a harder material may be used for the cone sleeves and the bolt than within the attachments. When tightening the cone sleeves by means of the nuts as the machine becomes loaded, one may, utilizing said material hardness difference, convert "beaten-out", oval attachment holes to a more circular shape, until the support surface is as large as it originally was. Thereby, one achieves that the ovality caused by deformation, creating slackness within the attachments, is shaped circular, having a somewhat larger diameter than the original. However, the increase in diameter is not a problem, the same being accommodated by means of the expanding cone sleeves.

The cone sleeves may be secured against rotation within the attachment holes by means of a fish plate mounted on a portion of the machine, e.g. a bifurcated member formed with said attachment holes. Such a fish plate may be adapted to rest against a plane portion of a flange on the cone sleeve. An additional security preventing the cone from sliding out of the attachment hole may be achieved by means of a steel disc fastened to the machine and resting outside the cone sleeve itself. This is a safety in case the threaded trunnion of the bolt should have been beaten off when digging in a quarry, or when machines are subjected to external impacts or wearing from wires on an offshore drilling rig.

A swivel link formed in accordance with the present invention has a simple construction and can accommodate even extreme torsional moments and forces acting on the bolt bearing. In case the bolt is subjected to rotational forces acting in one or the other direction of rotation, these forces will be counteracted efficiently.

Another advantage is that the plane surface portion or portions internally within the cone sleeve abut against elevation edges formed between plane and spherical conical portion of the bolt when the expanding cone sleeve has been pulled completely up on the bolt cone. Thereby it is also prevented that the cone sleeve is urged in beneath the slide bearing surrounding the central, circle-cylindrical portion of the bolt, creating friction within the bearing. This represents a large problem in known swivel links serving to accommodate slackness within attachments.

When using the invention, one does not have to use counter nuts or other locking nuts in order to prevent the cone sleeves from loosening. This contributes to shortening the protruding portions of the bolt. All such portions projecting beyond the bolt body occupy a vulnerable position subjected to hydraulic hoses or to blows and impacts from stones and the like when the equipment is in use.

An example of a preferred embodiment is further explained in the following, reference being made to the accompanying drawings, wherein.

Figure 1:
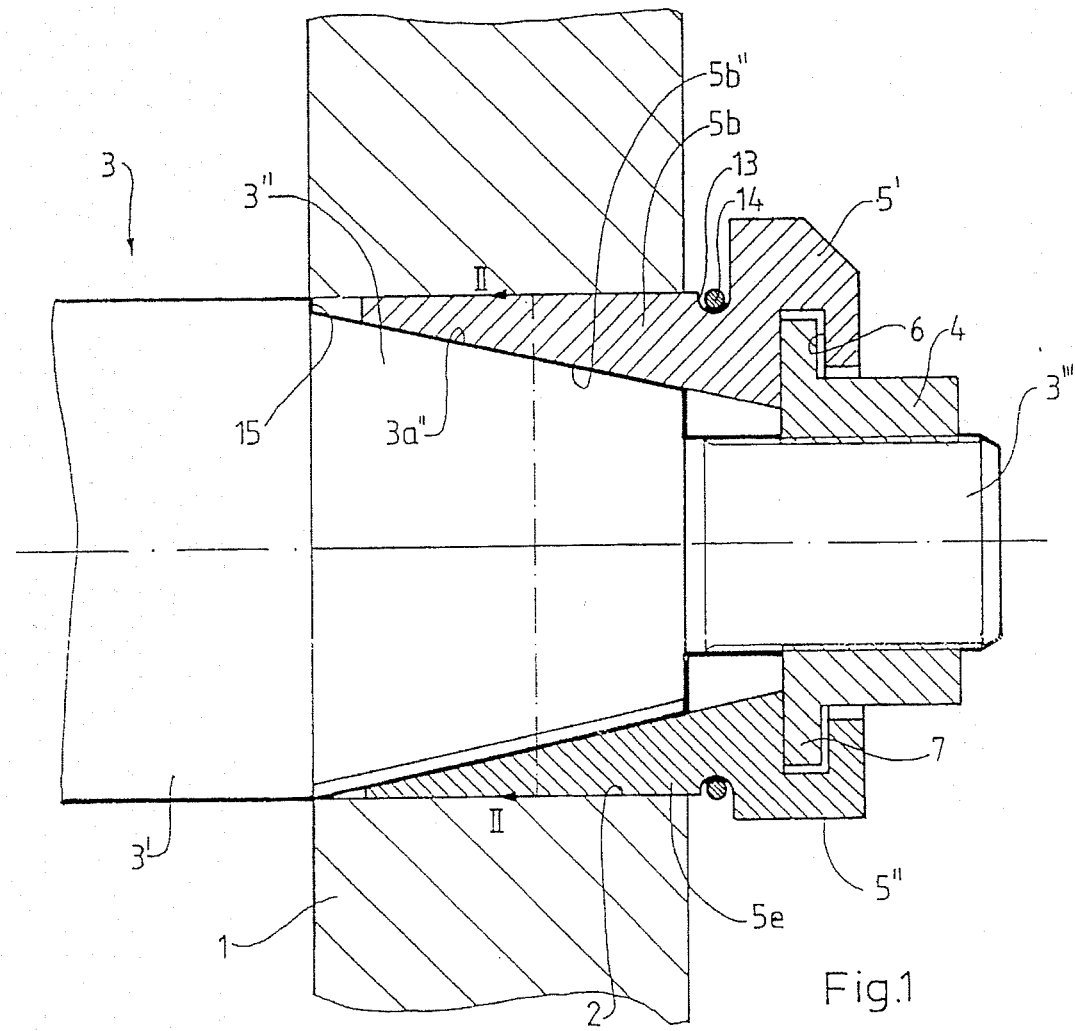
FIG. 1 shows a side elevational view/axial section of one end portion of a swivel link, the other end portion thereof being identical with the one shown, but where the middle portion may have varying axial length.
Figure 5:
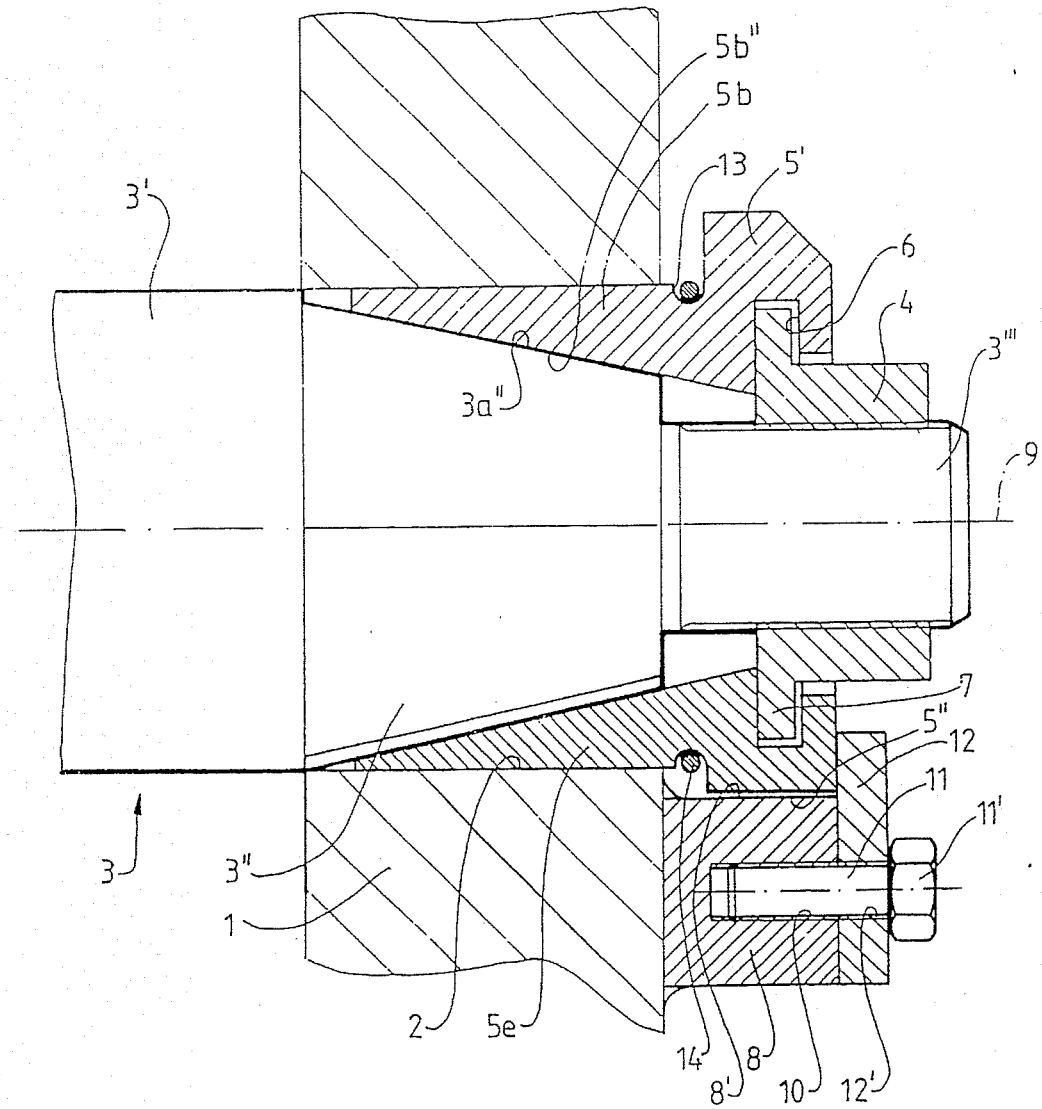
Figure 6:
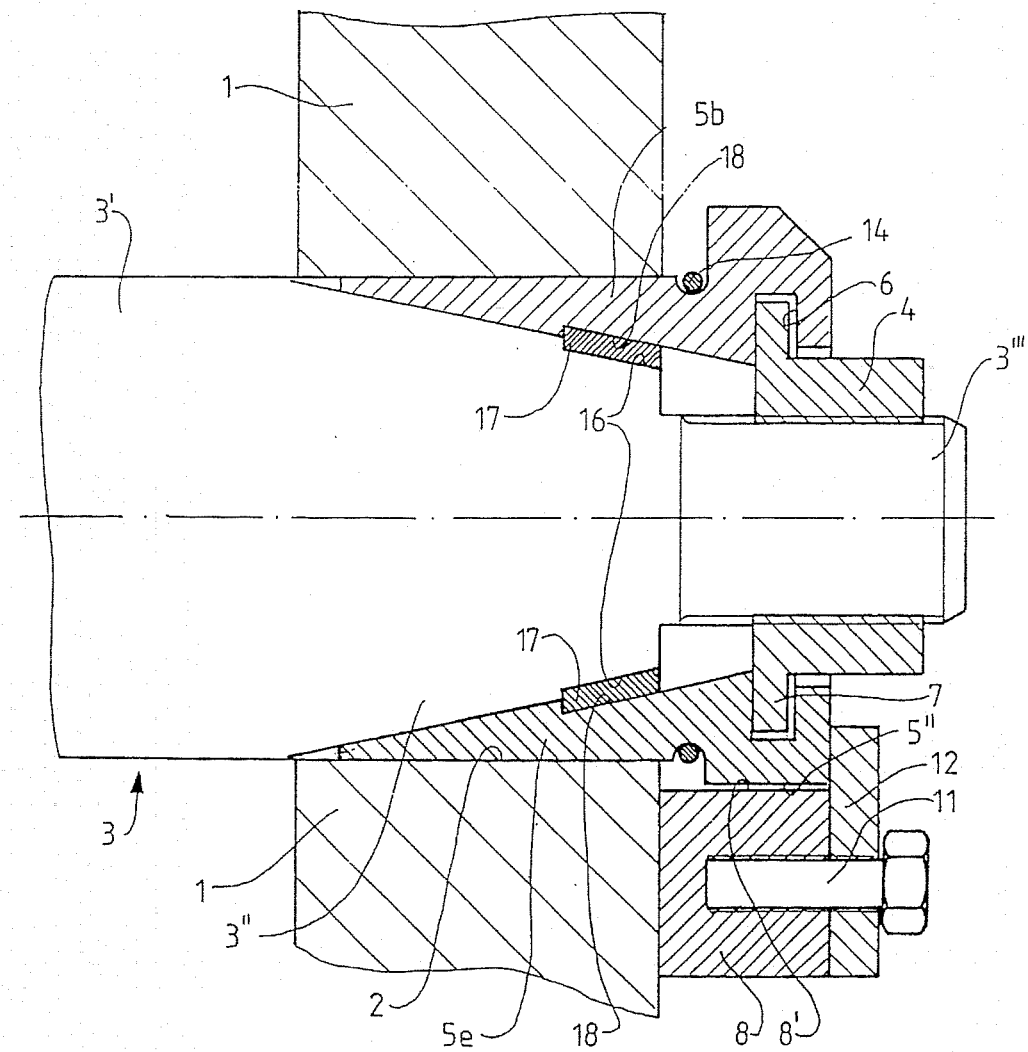
Figure 7:
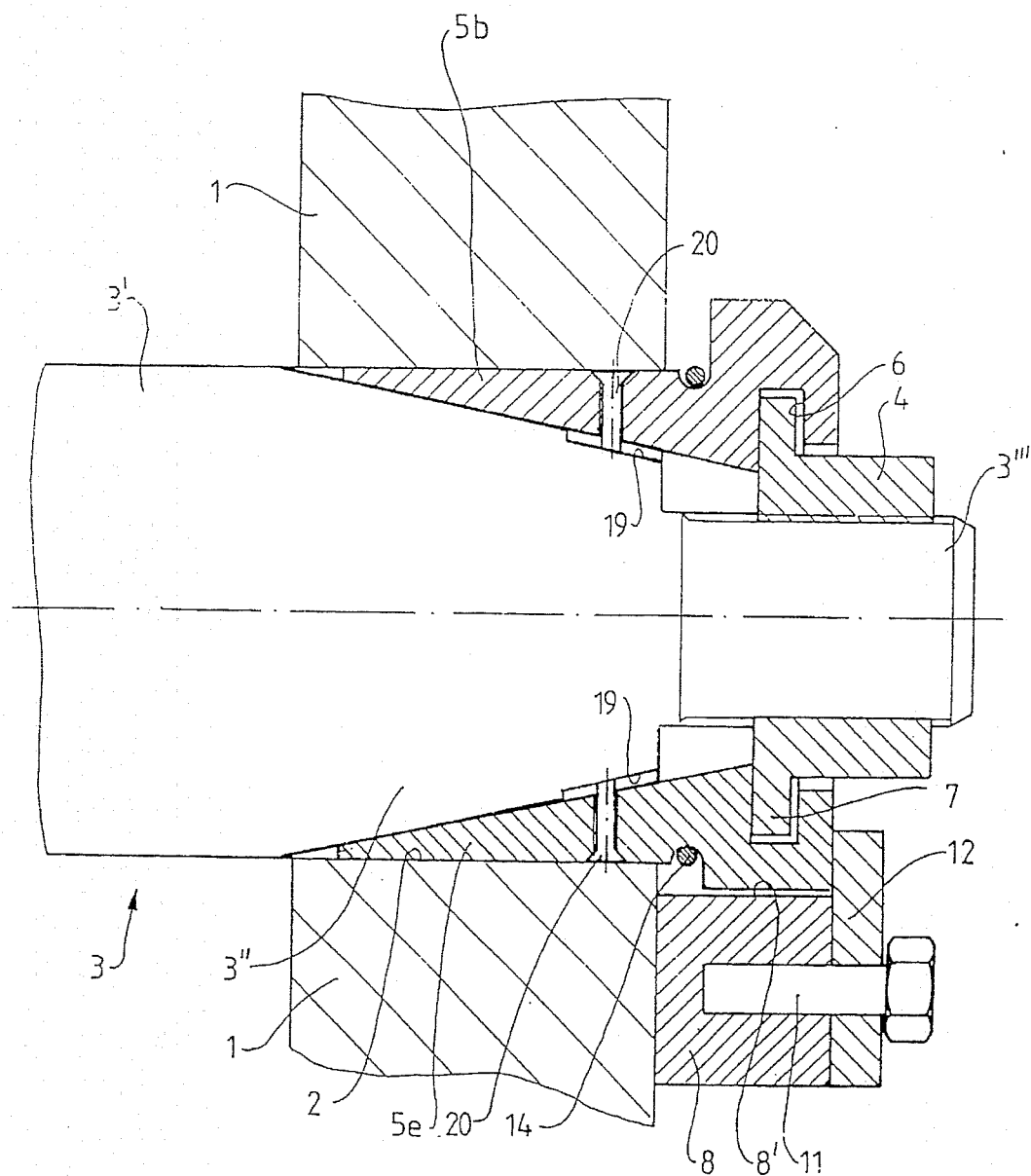

FIG. 5 corresponds to FIG. 1, but here the swivel link is shown in association with an additional security device preventing the cone sleeve from being urged out of the attachment hole;

FIG. 6 corresponds in section view to FIG. 5, but illustrates an alternative embodiment of the device counteracting relative rotation between the bolt and cone sleeve;

FIG. 7 corresponds to FIG. 6, but shows a somewhat modified embodiment of the device of FIG. 6.

First, reference is made to FIG. 1, showing a partial view of a swivel link according to the present invention, only one end portion and part of the middle portion being shown. However, the other end portion of the swivel link is identical to the one shown, while the middle portion, merely comprising the bolt, may have varying length. It is the last-mentioned bolt portion which, possibly through a bearing, e.g. a slide bearing, provides the pivotal suspension of a machine or building construction member in relation to another member forming the attachment of the swivel link. In the drawings, the pivoted member is not shown.

Thus, the swivel link according to the invention is especially intended for use in the pivoted interconnection of two relatively rotatable members at the adjacent end portions of said members, wherein one member's end portion 1 may be bifurcated (only one fork branch 1 being shown in FIGS. 1 and 5) and formed with two aligned swivel link attachment holes 2 (only one being shown in FIGS. 1, 5 and 7) which, in the pivotally interconnected condition of the two said members, correspond to a through-going bore (not shown) of the end portion of the other, pivoted member which, through the bore thereof accommodates the central bolt portion 3', possibly through the intermediary of a bearing.

Axially outside the central, circle-cylindrical bolt portion 3', the bolt 3 of the swivel link is at each end thereof formed with a conical, outwardly tapering end portion 3" and, outside the latter, with a coaxial threaded end trunnion 3''' for a tightening nut 4 for an expandable, internally conical sleeve 5, which serves to fix the conical end portion 3" of the bolt 3 within the attachment hole 2, whereby the outer surface of the cone sleeve 5 will rest and press against the attachment hole wall.

The cone sleeve (actually each cone sleeve) is, at the axially outer end thereof, formed with a radially outwardly directed flange portion 5' provided with an internal circumferential groove 6 for the accommodation of a collar 7 on the nut 4. As such, such a design is not the subject matter of the present invention.

Figure 2:
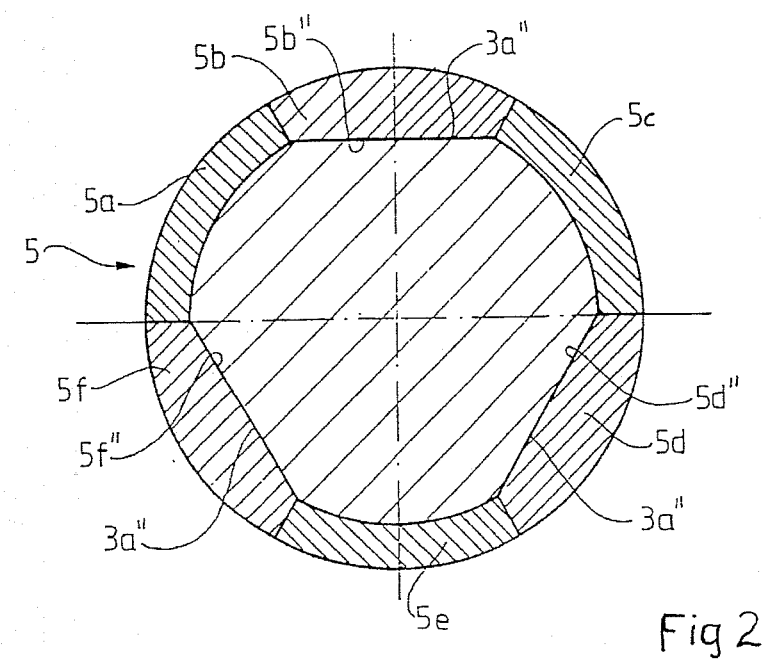
FIG. 2 is a cross section through bolt and cone sleeve along the line II—II in FIG. 1.
Figure 3:
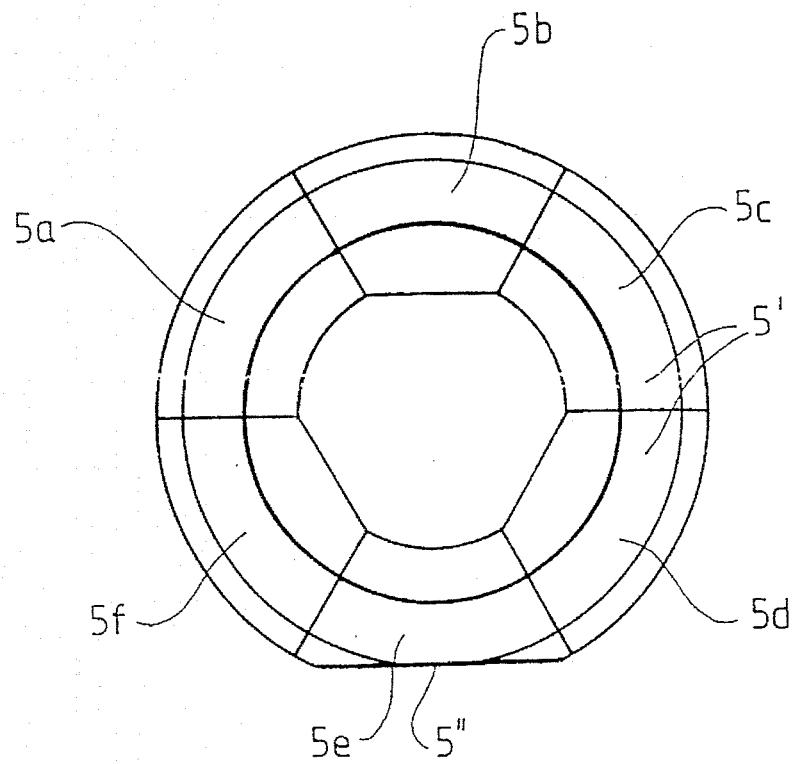
FIG. 3 is an end view of a cone sleeve composed of segments, seen from the narrow end.
Figure 4:
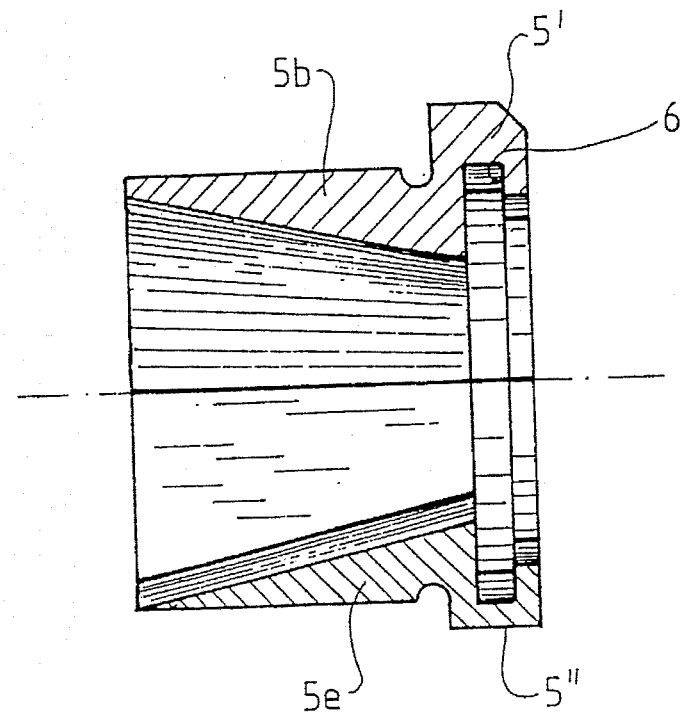
FIG. 4 is an axial section through a cone sleeve, corresponding to FIG. 1.

In accordance with the embodiment shown, each cone sleeve may consist of a number of segments. Thus, FIGS. 2 and 3 show that the cone sleeve comprises six segments 5a, 5b, 5c, 5d, 5e and 5f. These are loose and rest against each other with radially/axially extending neighbouring edge surfaces. The loose cone sleeve segments 5a–5f make the cone sleeve expandable in radial directions. Alternatively, the cone sleeve could have consisted of resilient material and/or split in the longitudinal direction. Also in the latter case, an expansion sleeve is achieved.

Prior art technique presupposes spherical conical surfaces on the bolt portion 3" and internally within the cone sleeve 5.

According to a substantial feature of the present invention, each conical bolt portion 3" is formed with at least one axially extending plane surface portion 3a". According to FIG. 2, three such plane surface portions 3a" are distributed equidistantly around the circumference of the bolt portion 3".

It appears from FIG. 2 that the cone sleeve segments 5b, 5d and 5f are formed with corresponding plane surface portions 5b", 5d" and 5f".

The cooperating plane surface portions on bolt 3 and within cone sleeve 5, respectively 3a" and 5b", 5d", 5f", counteract efficiently relative rotation between bolt 3 and cone sleeve 5. The cone sleeve segment abut against the elevation edges 15 when the expandable cone sleeves 5 are pulled entirely up on the bolt cones 3". This also prevents the cone sleeves from being pressed in beneath the slide bearing (not shown, but they will surround the central bolt portion 3'). Such a pressing-in could cause a large friction and wearing within the bearing.

According to FIG. 5, on the machine/building/construction member 1 formed with the attachment hole 2, is welded an intermediate piece 8 which has a threaded bore 10 for a screw bolt 11 having a fixed head 11' (or a pin screw having loose tightening nuts), said threaded bore 10 extending parallel to the axis 9 of the swivel link/bolt.

The intermediary piece 8 and the bolt 11,11' serve to fix a fish plate 12 having a through-going hole 12' for the bolt 11.

With the free end portion thereof, this fish plate 12 rests against the axially outermost, radially extending end surface of the cone sleeve segment's 5e flange portion 5'. Such a device insures that the cone sleeve 5 can not be dislodged from the attachment hole 2.

Adjacent the cone sleeve flange 5', each cone sleeve segment is formed with an external circumferential groove 13 for a rubber ring or the like 14 keeping the sleeve segment 5a–5f together.

In order to prevent the cone sleeve and bolt from rotating together within the attachment hole 2, the cone sleeve flange 5' may, over a partial circumferential portion (e.g. across the cone sleeve segment 5e), be formed with an externally plane portion 5" which, upon said undesired rotation, will be stopped by the opposing surface 8' of the intermediate piece 8. Moreover, the plane external portion of the cone sleeves 5 is shown in FIGS. 1, 3, 4 and 5.

FIGS. 6 and 7 show modified embodiments of an alternative example of a device adapted to counteract relative rotation of bolt 3 and cone sleeve 5 at each bolt end portion.

This alternative rotation-counteracting device operates according to the mortice/tenon-principle, wherein the conical portion 3" of the bolt 3 in the embodiment of FIG. 6 is formed with one or more axially directed grooves 16 for one or more wedges 17, which are wedged within the groove/grooves 16 and which, as tenons, cooperate with corresponding, axially directed grooves 18 provided internally within the respective sleeve 5. Thereby, the groove or mortice of the cone sleeve 5 has a width preventing wedging to the wedge(s).

Which part 3 or 5 that carries the wedge(s) and which part 5 or 3 is formed with cooperating groove(s) is, of course, unimportant.

In the embodiment of FIG. 7, it is the cone sleeve 5 that is provided with radially directed screws 20, while respective conical bolt portion 3" is formed with cooperating grooves 19. Then, the grooves or mortices 19 of the bolt 3 have a width preventing wedging to the screws 20 of the cone sleeve 5.

We claim:

1. A link for pivotally connecting a first member to a second member, said second member having a portion embracing the first member, said embracing portion of said second member having link attachment holes aligned with a pivot hole in said first member, said link comprising:

a shaft positionable in the aligned holes, said shaft having a central axis extending between a pair of threaded ends of said shaft, said shaft having a central cylindrical portion which is positioned in the pivot hole of said first member when said shaft is inserted in said aligned holes so that said first member may rotate with respect to said shaft, said shaft having tapering end portions intermediate said central portion and each of the threaded ends of said shaft, the outer surface of each of said tapering end portions being inclined toward the central axis of the shaft in a direction toward the respective end of said shaft, one of said tapering end portions being positioned in each of said attachment holes of said second member portion when said shaft is inserted in said aligned holes;

an expandable, internally tapered wedge sleeve member mounted on each of said tapering end portions of said shaft to surround said outer surface of said tapering end portion; and a nut threaded on each of said ends of said shaft, each of said nuts being axially movable along said shaft responsive to relative rotation between the nuts and said shaft, each of said nuts engaging one of said wedge sleeve members for moving the wedge sleeve member along the inclined outer surface of one of said tapering end portions by the movement of the associated nut along said threaded end of said shaft, movement of said sleeve members up the inclined outer surface of said tapering end portions bringing said sleeve members into wedging engagement with the attachment holes of said second member portion to secure said link to said second member;

each of said tapering end portions of said shaft having a plurality of circumferentially spaced, axially extending planar surface portions and a plurality of conical surface portions intermediate said planar surface portions, the sum of the number of planar surface portions and the number of conical surface portions being an even number;

each of said sleeve members comprising a plurality of peripheral segments, the total number of which corresponds to the sum of the planar surface portions and conical surface portions of a tapering end portion of said shaft, every other segment of said sleeve member having a planar inner surface mating with a planar surface portion of said tapering end portion of said shaft, the other segments of said sleeve member having a conical inner surface mating with a conical surface portion of said tapering end portion of said shaft.

2. A link as set forth in claim 1 wherein said sleeve member has a radially extending flange, said flange being external of, but proximate to, said second member portion adjacent an attachment hole when said link is inserted in said aligned holes, and wherein said link includes a means mountable on said second member portion and engaging said radially extending flange for preventing movement of said sleeve member with respect to said second member portion.

3. A link as set forth in claim 2 wherein said engaging means is further defined as preventing axial movement of said sleeve member with respect to said second member portion.

4. A link as set forth in claim 2 wherein said engaging means is further defined as preventing rotary movement of said sleeve member with respect to said second member portion.

5. A link as set forth in claim 4 wherein said radially extending flange has a flat surface lying parallel to, but spaced from, the axis of said shaft, and wherein said engaging means has a corresponding flat surface engaging said flat surface of said radially extending flange when said engaging means is mounted on said second member portion for preventing said sleeve member from rotating with respect to said second member portion.

6. A link as set forth in claim 1 wherein at least one of said sleeve members and shaft is made of a material that is harder than the material of said second member portion.

* * * * *